United States Patent [19]
Kolouch

[11] Patent Number: 6,140,410
[45] Date of Patent: Oct. 31, 2000

[54] FLUOROPOLYMER COMPOSITION

[75] Inventor: Robert Joseph Kolouch, Vienna, W. Va.

[73] Assignee: E. I. du Pont de Nemours and Company, Wilmington, Del.

[21] Appl. No.: 09/114,453

[22] Filed: Jul. 13, 1998

Related U.S. Application Data

[60] Provisional application No. 60/058,289, Sep. 9, 1997.

[51] Int. Cl.[7] .................................. C08J 3/00; C08K 3/20; C08L 27/00; C08L 27/12; C08F 8/00

[52] U.S. Cl. ........................... 524/520; 525/185; 525/191; 525/199; 525/200

[58] Field of Search ............................. 524/520; 525/185, 525/191, 199, 200

[56] References Cited

U.S. PATENT DOCUMENTS

| | | | |
|---|---|---|---|
| 5,093,403 | 3/1992 | Rau et al. | 524/404 |
| 5,230,961 | 7/1993 | Tannenbaum | 428/422 |

FOREIGN PATENT DOCUMENTS

| | | | |
|---|---|---|---|
| 0 626 424 A1 | 12/1993 | European Pat. Off. | C08L 27/12 |
| 0 709 428 A1 | 4/1995 | European Pat. Off. | C08L 27/12 |
| 0 728 776 A1 | 6/1995 | European Pat. Off. | C08F 214/18 |
| 0 761 757 A1 | 8/1996 | European Pat. Off. | C08L 51/00 |

*Primary Examiner*—Patrick D. Niland
*Attorney, Agent, or Firm*—Thomas W. Steinberg

[57] ABSTRACT

Fluoropolymer compositions containing melt-fabricable functionalized fluoropolymer and high temperature resistant thermoplastic adhesion promoter have enhanced adhesion to metal at low concentrations of high temperature resistant thermoplastic.

14 Claims, No Drawings

FLUOROPOLYMER COMPOSITION

RELATED APPLICATION

This application claims the benefit of Provisional Application Ser. No. 60/058,289 filed Sep. 9, 1997.

FIELD OF THE INVENTION

This invention is in the field of melt-fabricable fluoropolymers, and is specifically concerned with melt-fabricable fluoropolymer compositions having enhanced properties.

BACKGROUND OF THE INVENTION

Fluoropolymer resins, and especially perfluoropolymer resins, are known for their low surface energy and antistick properties and thermal and chemical resistance. These copolymers do not stick to other materials, especially dissimilar materials, with any practical degree of bond strength.

Some high temperature resistant thermoplastics (HTRP), such as polyamide imide, polyarylene sulfide and polyether sulfone, have found use as adhesion promoters in fluoropolymer coating formulations. See, for example U.S. Pat. No. 5,230,961 (Tannenbaum) and U.S. Pat. No. 5,093,403 (Rau el al.). However, such adhesion promoters are typically used in relatively high proportions which can detract from the properties of the fluoropolymer. For example, U.S. Pat. No. 5,230,961 claims (claim 7) a coated substrate wherein the primer contains 15–30% of polyamide imide and 25–55% of perfluoropolymer, and TABLE 14 of U.S. Pat. No. 5,093,403 gives primer formulations containing 15–20 wt % of polyphenylene sulfide or polyetheretherketone.

There remains a need for melt-flowable fluoropolymer with improved adhesion to dissimilar materials but which substantially retains the thermal and chemical resistance of fluoropolymer.

SUMMARY OF THE INVENTION

This invention provides a melt-fabricable fluoropolymer composition comprising minor amounts of functionalized fluoropolymer and high temperature resistant thermoplastic resin adhesion promoter and a major amount of non-functional fluoropolymer. The composition exhibits synergistic enhanced adhesion to metal, enabling one to use relatively low concentrations of high temperature resistant thermoplastic (adhesion promoter) to achieve adhesion, so that the composition has predominantly fluoropolymer character.

DETAILED DESCRIPTION

It has been discovered that a combination of functionalized fluoropolymer and high temperature resistant thermoplastic (HTRP) in a fluoropolymer composition results in a synergistic increase in the adhesion of the resultant composition to metal. When both components are present, the adhesion result is better than would be predicted from adhesion results when only one of these components is present. In one aspect, notably, the presence of the functionalized fluoropolymer enhances rather than interferes with the adhesion promotion of the HTRP. As a result, relatively low concentrations of HTRP can be used to achieve good adhesion, so that the composition has a relatively high proportion of fluoropolymer and, therefore, predominantly fluoropolymer characteristics.

As used herein, "functionalized fluoropolymer" means fluoropolymer having functional side groups or functional groups attached to side groups. Usually, but not necessarily, such functional units are at the ends of the pendant side groups. Functional groups, in the context of the present invention, are groups capable of enhancing the effect of HTRP adhesion promoter, when functional groups and HTRP adhesion promoter are both present in a fluoropolymer composition, to achieve an adhesive bond between the fluoropolymer composition and a metal surface, e.g., to form a laminate. Such functional groups can be introduced, for example, by incorporating into the fluoropolymer, during polymerization, monomer units having such functional groups, i.e., functional monomers.

Functional groups that can enhance the effect of HTRP adhesion promoter include ester, alcohol, acid (including carbon-, sulfur-, and phosphorus-based acid) and salt and halide thereof. Other functionalities include cyanate, carbamate, nitrile, and the like. Specific functional groups that can be used include —$SO_2F$, —CN, —COOH and —$CH_2$—Z wherein —Z is —OH, —OCN, —O—(CO)—$NH_2$, or —$OP(O)(OH)_2$. Preferred functional groups include —$SO_2F$ and —$CH_2$—Z wherein —Z is —OH, —O—(CO)—$NH_2$, or —$OP(O)(OH)_2$. The functional groups —$CH_2$—Z wherein —Z is —OH, —O—(CO)—$NH_2$ or —$OP(O)(OH)_2$ are especially preferred. As one skilled in the art will recognize, more than one type of functional group can be present. Normally, however, a single type of functional group is used.

The concentration of functional groups in the fluoropolymer resin component, i.e., in functionalized fluoropolymer plus non-functional fluoropolymer, of the melt-fabricable fluoropolymer composition used in the laminate of this invention is effective to enhance the effect of HTRP adhesion promoter and thereby to enable good adhesion to metal at low HTRP concentration. As will be recognized by one skilled in the art, the concentration of functional groups that is effective to enhance the effect of HTRP adhesion promoter can vary at least with the type of functional group and with the type of HTRP. The concentration of functional groups present can be expressed relative to the number of main chain carbon atoms in the fluoropolymer resin. Generally, the concentration of functional groups present is at least about $25/10^6$ main chain C atoms, based on total fluoropolymer in the composition. The concentration of functional groups is usually in the range of 25–2500 per $10^6$ main chain C atoms, preferably in the range of 50–2000 per $10^6$ main chain C atoms, based on total fluoropolymer present.

One skilled in the art will recognize that the desired concentration of functional groups in the functionalized fluoropolymer resin can be achieved with a single fluoropolymer having functional groups, or a mixture of such fluoropolymers having the same or different functional groups. However, a single fluoropolymer having only one type of functional group is normally used. Likewise, the non-functional fluoropolymer component of the composition can be a blend of non-functional fluoropolymers.

Thus, in the present invention, the melt-fabricable fluoropolymer composition contains minor amounts of functionalized fluoropolymer and high temperature resistant thermoplastic resin, and a major amount of non-functional fluoropolymer. By "major amount" is meant at least 50 wt %, preferably at least 70 wt %, of non-functional fluoropolymer based on combined weight of non-functional fluoropolymer, functional fluoropolymer, and HTRP adhesion promoter. The composition preferably contains 1–30 wt %, more preferably 1–20 wt %, most preferably 3–15 wt %, of functionalized fluoropolymer and 0.5–10 wt %, more preferably 1–5 wt %, of HTRP adhesion promoter, based on combined weight of non-functional fluoropolymer, functionalized fluoropolymer, and HTRP. The concentration of functional groups in the functionalized fluoropolymer alone will be higher than recited above for total fluoropolymer according to the amount of non-functional fluoropolymer present in the blend.

Fluoropolymer resins that can be used include copolymers of TFE with one or more copolymerizable monomers chosen from perfluoroolefins having 3–8 carbon atoms and perfluoro(alkyl vinyl ethers) (PAVE) in which the linear or branched alkyl group contains 1–5 carbon atoms. Preferred perfluoropolymers include copolymers of TFE with at least one of hexafluoropropylene (HFP) and PAVE. Preferred comonomers include PAVE in which the alkyl group contains 1–3 carbon atoms, especially 2–3 carbon atoms, i.e. perfluoro(ethyl vinyl ether) (PEVE) and perfluoro(propyl vinyl ether) (PPVE). Additional fluoropolymers that can be used include copolymers of ethylene with TFE, optionally including minor amounts of one or more modifying comonomer such as perfluorobutyl ethylene. Representative fluoropolymers are described, for example, in ASTM Standard Specifications D-2116, D-3159, and D-3307. Such fluoropolymers are non-functional fluoropolymers if they have essentially no functional groups, but are functionalized fluoropolymers if functional groups are added, e.g., by grafting or by copolymerization. Preferred fluoropolymers are perfluoropolymers, except for functional units or groups. Alternatively or additionally, preferred fluoropolymers are non-elastomeric, as opposed to elastomeric.

Functionalized fluoropolymers include fluoropolymers such as those described in the foregoing paragraph and additionally containing copolymerized units derived from functional monomers. If the concentration of functional monomer is high enough in a TFE copolymer, however, no other comonomer may be needed. See, e.g., Example 18 below. Usually, but not necessarily, the functional groups introduced by such monomers are at the ends of pendant side groups. Functional monomers that introduce pendant side groups having such functionality can have the general formula $CY_2=CY-Z$ wherein Y is H or F and Z contains a functional group. Preferably, each Y is F and —Z is —$R_f$—X, wherein $R_f$ is a fluorinated diradical and X is a functional group that may contain $CH_2$ groups. Preferably, $R_f$ is linear or branched perfluoroalkoxy having 2–20 carbon atoms, so that the functional comonomer is a fluorinated vinyl ether. Examples of such fluorovinylethers include $CF_2=CF[OCF_2CF(CF_3)]_m-O-(CF_2)_nCH_2OH$ as disclosed in U.S. Pat. No. 4,982,009 and the alcoholic ester $CF_2=CF[OCF2CF(CF_3)]_m-O-(CF_2)_n-(CH_2)_p-O-COR$ as disclosed in U.S. Pat. No. 5,310,838. Additional fluorovinylethers include $CF_2=CF[OCF_2CF(CF_3)]_mO(CF_2)_nCOOH$ and its carboxylic ester $CF_2=CF[OCF_2CF(CF_3)]_mO(CF_2)_nCOOR$ disclosed in U.S. Pat. No. 4,138,426. In these formulae, m=0–3, n=1–4, p=1–2 and R is methyl or ethyl. Preferred such fluorovinylethers include $CF_2=CF-O-CF_2CF_2-SO_2F$; $CF_2=CF[OCF_2CF(CF_3)]O(CF_2)_2-Y$ wherein —Y is —$SO_2F$, —CN, or —COOH; and $CF_2=CF[OCF_2CF(CF_3)]O(CF_2)_2-CH_2-Z$ wherein —Z is —OH, —OCN, —O—(CO)—$NH_2$, or —OP(O)(OH)$_2$. These fluorovinylethers are preferred because of their ability to incorporate into the polymer and their ability to incorporate functionality into the resultant copolymer.

Compounds having the formula $CF_2=CF-R_f-(CH_2)_n-X$ in which X is —OCN (cyanate), —O—(CO)—$NH_2$ (carbamate), or —OP(O)(OH)$_2$ (phosphono) can be synthesized as follows. The cyanate can be prepared in high yield by a one-step process in which known compounds having the general formula $CF_2=CF-R_f-(CH_2)_n-OH$ (I), wherein n is 1–3 and $R_f$ is perfluorolkyl or perfluoroalkoxy containing 1–20 carbon atoms, are reacted with cyanogen bromide (CNBr) or cyanogen chloride (CNCl) in the presence of non-nucleophilic base. The carbamate can be prepared from the cyanate by contacting cyanate with acid at elevated temperature for time sufficient to complete conversion of cyanate to carbamate. The phosphorus-containing compounds can be prepared in high yield by a process in which compounds (1) are reacted with $P(O)Cl_3$ or $P(O)Br_3$, either neat or in aprotic solvent, to obtain the chloride or bromide, e.g., $CF_2=CF-R_f-(CH_2)_n-OP(O)(Cl_2)$, followed by hydrolysis to obtain the acid —OP(O)—(OH)$_2$. Specific conditions are disclosed in Monomer Preparations 1–2 below. Also see European Patent Application Publication 0 829 471 and PCT Patent Application Publication WO98/11114 with respect to preparation of these compounds.

When functionalized fluoropolymer is achieved by copolymerization, the amount of functional monomer in the functionalized fluoropolymer of this invention is small to achieve the desired concentration of functional groups, even when functionalized fluoropolymer is a blend comprising non-functional fluoropolymer. Generally, the amount of functional monomer is no more than 10 wt %, preferably no more than 5 wt %, based on total weight of functionalized fluoropolymer, i.e., the fluoropolymer component containing the functional monomer. In certain instances, higher concentrations of functional monomer approaching and even exceeding 10 wt % may be desired, for example, to achieve good bonds to substrate metal such as stainless steel, or when it is not desired to use a non-functional monomer in the functionalized melt-fabricable fluoropolymer. While the functionalized fluoropolymer can be uniform, it is not necessary to have a uniform concentration of functional monomer throughout the functionalized fluoropolymer.

The fluoropolymer composition of this invention is melt-fabricable. As such, the composition generally has melt viscosity (MV) in the range of $0.5-50 \times 10^3$ Pa·s though viscosities outside this range can be used. MV is measured according to ASTM D-1238 at the temperature appropriate for the predominant fluoropolymer component of the composition. Preferably, MV is in the range of $1-25 \times 10^3$ Pa·s. Usually, the MV of each fluoropolymer component is within the aforesaid ranges, but blending will permit a minor component to have MV in a wider range, as will be understood by one skilled in the art.

HTRP that can be used in this invention are chosen from melt-flowable heat-resistant organic polymers which are adhesion promoters and which have melting temperature, or glass transition temperature if amorphous, at least as high as the use temperature of the highest-melting fluoropolymer used as the major portion of the composition. Preferably, the HTRP exhibits melt flow at temperatures used for compounding and fabrication of the compositions, or fusing of powders or dispersions. Generally, HTRP are as defined by Koch in "High Temperature Resistant Thermoplastics—Products and General Properties" (Conference on High Temperature Thermoplastics, Ludwigshafen, 1993) and have continuous service temperatures of more than 140° C. Such thermoplastics that are adhesion promoters include, for example, polyaryletherketones; polyarylenesulfides; polysulfones including polyethersulfones, including aromatic polyethersulfones; polyimides including polyamideimides, polyesterimides, and polyetherimides; aromatic polyethers; and polyacrylonitrile. HTRP adhesion promoters do not include liquid crystal polymers. Preferred HTRP include polyetheretherketones (PEEK), polyetherketoneketones (PEKK), polyphenylenesulfide (PPS), polyethersulfone (PES), and polyamideimides (PAI). Such polymers are known in the art. Representative HTRP used to illustrate the invention are listed in Table 2 below.

The melt-fabricable fluoropolymer compositions of this invention can have various forms. They can be melt-mixed compositions, e.g., compounded using melt processing equipment of conventional design and suitably equipped for handling fluoropolymers at melt temperatures, such as twin rotor mixers and extruders with good mixing capability. The compositions can also be powder blends, or dispersion or slurry blends.

The fluoropolymer composition can be processed by means, such as known in the art, appropriate to the physical form of the composition to form a laminate or to prepare the fluoropolymer component of a laminate. Thus, for example, the composition can be extruded or injection molded, or deposited by powder coating techniques such as rotolining or electrostatic spraying if the composition is a powder, or applied by wet coating techniques such as roll coating or spraying if the composition is a dispersion, followed by drying and fusing, and the like.

As shown by the examples to follow, the melt-fabricable fluoropolymer compositions of this invention exhibit good adhesion to metal at low concentrations of HTRP. Good adhesion is indicated by a peel strength of at least 700 g/cm, preferably at least 1000 g/cm, when measured in a peel test against aluminum as hereinafter described. Hence, the compositions are useful in laminates either as a primer or as a sole fluoropolymer component. The metal surface can be rough or smooth. The Examples to follow illustrate that the melt-fabricable composition of the present invention can adhere to smooth metal surfaces which is more difficult than adherence to rough surfaces. As known to those skilled in the art, the adhesion of coatings to metal can be enhanced by roughening the metal surface, e.g., by sandblasting. Generally, the metal surface should be free of dirt and grease.

EXAMPLES

Compositions were prepared for testing by melt compounding fluoropolymer resins and additives either in a laboratory twin-rotor mixer with roller type rotors (Rheomix® 3000, Haake Buechler) controlled and driven by Haake's Rheocord® 40 microprocessor controlled torque rheometer or in a 28-mm twin screw extruder (Werner & Pfleiderer). When using the twin-rotor mixer, all components were charged to the mixing chamber together. Temperature and rotor speed were controlled by adjustment within the microprocessor. The product removed from the mixer after melt blending was in relatively large chunks, which were cut into small pieces suitable for molding, or, in some cases, these small pieces were ground into a powder before molding. When using the extruder system, all components were combined in a plastic bag (or drum) and pre-blended by shaking and kneading (or tumble blending in a drum) before introducing the mixture into the feed hopper of the extruder. The extruder system yielded strands which were cut into pellets which were used directly to mold samples for performance testing. The amount of each component in the composition is expressed in wt % based on total combined weight of stated components.

Unless otherwise stated, TFE/PPVE copolymers containing a functional monomer were used in the following Examples to illustrate the invention. These functionalized fluoropolymers were prepared by aqueous dispersion polymerization generally by the method disclosed by Gresham & Vogelpohl (U.S. Pat. No. 3,635,926) using ethane as chain transfer agent (chloroform in one instance), except that a functional monomer was included in the initial charge to the reactor and buffer was not always used. Functional monomers employed are defined in Table 1. Functionalized fluoropolymer solids were isolated from the raw dispersion by mechanical shear coagulation and filtering, followed by drying. The compositions of functionalized fluoropolymers was determined by Fourier transform infrared spectroscopy.

TABLE 1

Functional Monomer Identification

| Code | Identification or Description |
|---|---|
| EVE-OH | $CF_2$=CF—[$OCF_2CF(CF_3)$]—O—$CF_2CF_2$—$CH_2$—OH<br>9,9-dihydro-9-hydroxy-perfluoro(3,6-dioxa-5-methyl-1-nonene) |
| EVE-P | $CF_2$=CF—[$OCF_2CF(CF_3)$]—O—$CF_2CF_2$—$CH_2$—OP(O)(OH)$_2$<br>9-phosphono-9,9-dihydro-perfluoro(3,6-dioxa-5-methyl-1-nonene) |
| EVE-COOH | $CF_2$=CF—[$OCF_2CF(CF_3)$]—O—$CF_2CF_2$—COOH<br>8-carboxyl-perfluoro(3,6-dioxa-5-methyl-1-octene) |
| EVE-carbamate | $CF_2$=CF—[$OCF_2CF(CF_3)$]—O—$CF_2CF_2$—$CH_2$—O—(CO)—$NH_2$<br>9-carbamate-9,9-dihydro-perfluoro(3,6-dioxa-5-methyl-1-nonene) |
| PDMOF | $CF_2$=CF—[$OCF_2CF(CF_3)$]—O—$CF_2CF_2$—$SO_2$F<br>8-fluorosulfonyl-perfluoro(3,6-dioxa-5-methyl-1-octene) |

Unless otherwise stated, compositions prepared in the following Examples included a non-functional TFEIPPVE copolymer (PFA) which was used in cube form as supplied (Teflon PFA fluoropolymer resin grade 340, DuPont). The peel strength measured against aluminum, as described below, for this resin alone was in the range of 185–345 g/cm.

HTRP adhesion promoters employed are defined in Table 2. All HTRP were obtained as granules or finely divided powders and were used as such.

TABLE 2

HTRP Identification

| Code | Name | Identification or Reference |
|---|---|---|
| PEEK | Polyetheretherketone | Victrex ® grade 380, ICI Ltd. |
| PPS | Polyphenylenesulfide | Ryton ® grade V1, Phillips Petroleum |
| PES | Polyethersulfone | Victrex ® grade 3600P, ICI Ltd. |
| PEKK | Polyetherketoneketone | Gay et al., U.S. Pat. No. 4,816,556 |
| PAI | Polyamideimide | Torlon ® grade 4203L, Amoco |

Unless otherwise stated, melt flow rate (MFR) was measured at 372° C. by the method of ASTM D-1238 modified as described in U.S. Pat. No. 4,380,618. For such MFR measurement, MFR is related to melt viscosity (Mv) by the relationship MV=53.15/MFR, when MFR is in units of g/10 min and MV is in units of $10^3$ Pa·s.

Unless otherwise stated, samples were prepared for peel strength testing as follows. A steel plate 0.060-inch (1.5-mm) thick and 8-inch (20.3-cm) square was used as the base for the laminate fabrication. A 0.040-inch (1.0-mm) thick and 8-inch square chase having a 6-inch (15.2-cm) square opening was placed on the steel sheet. The chase was covered with an aluminum sheet 0.005 inch (0.13 mm) thick and 8 inches square as received from the manufacturer (A. J. Oster Co.), and a 2.5-inch (6.4-cm) wide strip of 0.002-inch (0.05-mm) thick polyimide film (Kapton®, DuPont Co.) was positioned along one edge of the aluminum so that it overlapped the opening in the chase by about 0.5 inch (1.3 cm). Then, about 65 g of the test resin composition were placed on the aluminum foil within the outline of the opening in the chase. The resin was covered with another aluminum sheet, and in turn another steel plate. This construction was then compressed in a platen press at temperature and pressure appropriate to the fluoropolymer used. After removal from the press, the laminate was placed between heavy steel plates at room temperature until cool, and then was cut into one-inch (2.5-cm) wide strips.

The peel strength values reported herein were determined as follows. The layers of the laminate strips were separated at the polyimide parting film, and fastened in the jaws of an Instron® tensile tester. The moving jaw was driven at a speed of 1 or 2 inch/min (2.5 or 5.1 cm/min) to peel the layers apart, holding the free end of the laminate taking on an angle of 180° with respect to the line of the jaws. The average force to peel the strips apart during the time interval between 30 sec and 100 sec of pulling was recorded, and is reported in force per unit width of strip.

Examples 1–5 and Controls

These Examples illustrate the present invention for several types of HTRP. The functional monomer employed in the functionalized fluoropolymer was EVE-OH (Table 1). Three functionalized fluoropolymers, prepared as described above, containing EVE-OH were employed. Fcn-FP-1 contained 3.1 wt % of PPVE and 7.3 wt % of EVE-OH, and had MV too high to measure. Fcn-FP-2 contained 3.6 wt % of PPVE and 3.1 wt % of EVE-OH, and had MV of 6.8×$10^3$ Pa·s. Fcn-FP-3 contained 4.5 wt % of PPVE and 1.6 wt % of EVE-OH, and had MV of 3.3×$10^3$ Pa·s. Compositions (wt %) shown in Table 3 were prepared using either the extruder or the twin-rotor mixer as the compounding device, indicated in Table 3 by E or M, respectively. For each composition, peel strength against aluminum was measured as described above. The results, also given in Table 3, show surprisingly higher adhesion when functionalized fluoropolymer and HTRP are both present in the composition. For example, the peel strength exhibited in Example 2 was more than 300% of the sum of the peel strengths when only functionalized fluoropolymer or HTRP was present in the fluoropolymer composition.

Examples 6–9 and Controls

These Examples illustrate the present invention for different proportions of functionalized fluoropolymer and HTRP. The functionalized fluoropolymer was Fcn-FP-3 (Examples 1–5). Compositions and results are shown in Table 4. All compositions were prepared in the extruder, except for Control J which was prepared in the twin-rotor mixer. As shown by the data in Table 4, adhesion was high for all of the compositions containing both the functionalized fluoropolymer and the HTRP.

TABLE 4

Compositions and Results for Examples 6–9

| Example/Control | I | J | K | 6 | 7 | 8 | 9 |
|---|---|---|---|---|---|---|---|
| Composition (wt %): | | | | | | | |
| Fcn-FP-3 | 2.5 | 10.0 | — | 2.5 | 2.5 | 10.0 | 20.0 |
| PEEK | — | — | 2.0 | 0.5 | 4.0 | 2.0 | 4.0 |
| PFA | 97.5 | 90.0 | 98.0 | 97.0 | 93.5 | 88.0 | 76.0 |
| Properties: | | | | | | | |
| MV ($10^3$ Pa · s) | 3.5 | 4.6 | 3.9 | 3.8 | 3.8 | 4.2 | 4.1 |
| Peel strength (g/cm) | 264 | 217 | 290 | 1532 | 1998 | 2121 | 2840 |

TABLE 3

Compositions and Results for Examples 1–5 and Controls

| Example/Control | A | B | 1 | C | D | 2 | E | 3 | F | 4 | G | H | 5 |
|---|---|---|---|---|---|---|---|---|---|---|---|---|---|
| Composition (wt %): | | | | | | | | | | | | | |
| Fcn-FP-1 | 10 | — | 10 | — | — | — | — | — | — | — | — | — | — |
| Fcn-FP-2 | — | — | — | 10 | — | 10 | — | 10 | — | 10 | — | — | — |
| Fcn-FP-3 | — | — | — | — | — | — | — | — | — | — | 10 | — | 10 |
| PPS | — | 3 | 3 | — | — | — | — | — | — | — | — | — | — |
| PES | — | — | — | — | 3 | 3 | — | — | — | — | — | — | — |
| PEKK | — | — | — | — | — | — | 3 | 3 | — | — | — | — | — |
| PEEK | — | — | — | — | — | — | — | — | 3 | 3 | — | — | — |
| PAI | — | — | — | — | — | — | — | — | — | — | — | 3 | 3 |
| PEA | 90 | 97 | 87 | 90 | 97 | 87 | 97 | 87 | 97 | 87 | 90 | 97 | 87 |
| Device | M | M | E | E | E | E | E | E | E | E | E | M | M |
| Properties: | | | | | | | | | | | | | |
| MV ($10^3$ Pa · s) | 6.8 | 4.1 | 4.6 | 3.9 | 4.3 | 3.8 | 3.7 | 4.1 | 3.9* | 3.9 | | 4.4 | 10.1 |
| Peel strength (g.cm) | 0 | 138 | 2056 | 135 | 433 | 1780 | 468 | 1504 | 386* | 2104 | | 703 | 1198 |

*Average of two preparations of Composition F.

Examples 10–11 and Controls

These examples illustrate the present invention for a functionalized fluoropolymer containing a different functional monomer (EVE-COOH). The functionalized fluoropolymer (Fcn-FP-4) contained 4.5 wt % of PPVE and 1.0 wt % of EVE-COOH, and had MV of $0.2 \times 10^3$ Pa·s. Compositions and results are shown in Table 5. As shown by the data, adhesion was high for the compositions containing both the functionalized fluoropolymer and the HTRP.

TABLE 5

Compositions and Results for Examples 10–11

| Example/Control | L | M | N | O | 10 | 11 |
|---|---|---|---|---|---|---|
| Composition (wt %): | | | | | | |
| Fcn-FP-4 | 20 | 25 | — | — | 20 | 25 |
| PEEK | — | — | 3 | 5 | 3 | 5 |
| PFA | 80 | 75 | 97 | 95 | 77 | 70 |
| Device | E | M | E | M | E | M |
| Properties: | | | | | | |
| MV ($10^3$ Pa·s) | 2.9 | 2.4 | 3.9 | 4.3 | 2.9 | 2.7 |
| Peel strength (g/cm) | 562 | 220 | 507 | 620 | 908 | 1380 |

Monomer Preparation 1

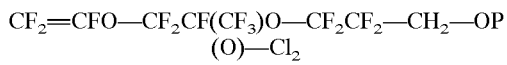

$$CF_2=CFO-CF_2CF(CF_3)O-CF_2CF_2-CH_2-OP(O)-Cl_2$$

A pre-dried flask was charged with EVE-OH (257 g, 0.652 mol), phosphoryl chloride (500 g, 3.257 mol) and anhydrous calcium chloride (3.6 g, 0.0324 mol). This reaction mixture was heated at 110° C. for 6–8 hr or until the EVE-OH starting material was consumed. The excess phosphoryl chloride was recovered by distillation at normal pressure. The residual liquid was then distilled under reduced pressure to give 9-phosphonochloride-9,9-dihydroperfluoro(3,6-dioxa-5-methyl-1-nonene) (EVE-P-chloride, formula above) product as a clear, colorless liquid having a boiling point of 85°–90° C. at 5 mmHg (or 67°–72° C. at 2 mmHg). Yield: 200 g (60%).

Monomer Preparation 2

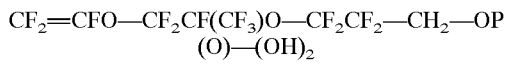

$$CF_2=CFO-CF_2CF(CF_3)O-CF_2CF_2-CH_2-OP(O)-(OH)_2$$

A round bottom flask was charged with 700 g (1.37 mol) of EVE-P-chloride and water (49.4 g, 2.75 mol) was slowly added. After all the water was added, the reaction mixture was stirred vigorously at ambient temperature overnight, then placed under high vacuum at 60° C. to remove any residual water and to give 9-phosphono-9,9-dihydroperfluoro(3,6-dioxa-5 -methyl-1-nonene) (EVE-P, formula above) product as a clear, viscous liquid (640 g, 98.6% yield).

Example 12 and Controls

This example illustrates the present invention for a functionalized fluoropolymer containing a different functional monomer (EVE-P). The functionalized fluoropolymer (Fcn-FP-5) contained 4.1 wt % of PPVE and 0.8 wt % of EVE-P, and had MV of $0.7 \times 10^3$ Pa·s. All compositions were prepared in the twin-rotor mixer. Compositions and results are shown in Table 6. As shown by the data, adhesion was high for the composition containing both the functionalized fluoropolymer and the HTRP.

TABLE 6

Compositions and Results for Example 12

| Example/Control | P | Q | 13 |
|---|---|---|---|
| Composition (wt %): | | | |
| Fcn-FP-5 | 10 | — | 10 |
| PEEK | — | 3 | 3 |
| PFA | 90 | 97 | 87 |
| Properties: | | | |
| MV ($10^3$ Pa·s) | 3.4 | 2.8 | 3.5 |
| Peel strength (g/cm) | 0 | 211 | 1086 |

Examples 13–14 and Controls

These examples illustrate the present invention for compositions containing non-functional fluoropolymer other than PFA. The non-functional fluoropolymers were a TFE/HFP copolymer (FEP) satisfying ASTM D-2116 Type I (Teflon® FEP fluoropolymer resin grade 100, DuPont) and a TFE/ethylene copolymer (ETFE) modified with perfluorobutyl ethylene (Tefzel® ETFE fluoropolymer grade 200, DuPont). The functionalized fluoropolymer was Fcn-FP-2 (Examples 1–5) or Fcn-FP-6 which contained 4.3 wt % of PPVE and 1.6 wt % of EVE-OH, and had MV of $0.7 \times 10^3$ Pa·s. The HTRP was PPS or PEEK. All compositions were prepared in the twin-rotor mixer. Compositions and results are shown in Table 7. MV for Example 14 and Controls T and U was determined by a method similar to that described above, but at 290° C. and using 36.0 (instead of 53.15) as the conversion factor. As shown by the data, adhesion was high for the compositions containing both the functionalized fluoropolymer and the HTRP, showing that different fluoropolymers can be used in compositions of the invention and the functional fluoropolymer need not be the same type as non-functional fluoropolymer.

TABLE 7

Compositions and Results for Examples 13–14

| Example/Control | R | S | 13 | T | U | 14 |
|---|---|---|---|---|---|---|
| Composition (wt %): | | | | | | |
| Fcn-FP-2 | 10 | — | 10 | — | — | — |
| Fcn-FP-6 | — | — | — | 10 | — | 10 |
| PPs | — | 3 | 3 | — | — | — |
| PEEK | — | — | — | — | 3 | 3 |
| FEP | 90 | 97 | 87 | — | — | — |
| ETFE | — | — | — | 90 | 97 | 87 |
| Properties: | | | | | | |
| MV ($10^3$ Pa·s) | 7.2 | 6.8 | 6.2 | 4.6 | 5.1 | 2.5 |
| Peel strength (g/cm) | 122 | 56 | 1720 | 411 | 1300 | 1698 |

Example 15 and Controls

This example illustrates the present invention for a composition containing a non-functional fluoropolymer (PFA-1) that has been chemically modified to enhance purity and improve thermal stability (Teflon® PFA fluoropolymer resin grade 440 HP, DuPont). The functionalized fluoropolymer (Fcn-FP-7) contained 3.5 wt % of PPVE and 6.2 wt % of EVE-OH, and had MV of $28 \times 10^3$ Pa·s. The compositions were prepared in the extruder. Compositions and results are shown in Table 8. As shown by the data, adhesion was high for the composition containing both the functionalized fluoropolymer and the HTRP.

TABLE 8

Compositions and Results for Example 15

| Example/Control | V | V | 15 |
|---|---|---|---|
| Composition (wt %): | | | |
| Fcn-FP-7 | — | 10.3 | 10.1 |
| PEEK | — | — | 1.7 |
| PFA-1 | 100.0 | 89.7 | 88.2 |
| Device | — | E | E |
| Properties: | | | |
| MV ($10^3$ Pa · s) | — | 4.1 | 4.2 |
| Peel strength (g/cm) | 0 | 0 | 1977 |

Example 16 and Controls

This example illustrates the present invention for a functionalized fluoropolymer composition containing graphite. The functionalized fluoropolymer (Fcn-FP-8) contained 3.7 wt % of PPVE and 6.5 wt % of EVE-OH, and had MV of $1.3 \times 10^3$ Pa·s. The non-functional fluoropolymer (PFA-2) in this instance was a different TFE/PPVE copolymer used in cube form as supplied (Teflon® PFA fluoropolymer resin grade 345, DuPont). All compositions were prepared in the twin-rotor mixer. Compositions and results are shown in Table 9. Peel strength was high for the composition containing both the functionalized fluoropolymer and the HTRP, showing that fluoropolymer compositions of this invention can contain inert filler.

TABLE 9

Compositions and Results for Example 16

| Example/Control | X | Y | Z | 16 |
|---|---|---|---|---|
| Composition (wt %): | | | | |
| Fcn-FP-8 | — | 16 | — | 16 |
| PEEK | — | — | 3 | 3 |
| PFA-2 | 80 | 64 | 77 | 59 |
| Graphite | 20 | 20 | 20 | 22 |
| Properties: | | | | |
| MV ($10^3$ Pa · s) | 29 | 195 | 31 | 52 |
| Peel strength (g/cm) | 143 | 180 | 196 | 1965 |

Examples 17–18 and Controls

This example illustrates the present invention using type 321 stainless steel foil 0.002 inch (0.051 mm) thick (PTP-512, Lyon Industries) instead of aluminum as the test metal. The foil was clean as received from the manufacturer and was used as received. Compositions and results are shown in Table 10. Fcn-FP-9 was a TFE copolymer containing 10.6 wt % of EVE-OH and no PPVE, and having MV of $1.7 \times 10^3$ Pa·s. I.e., the concentration of functional monomer was high enough that non-functional comonomer could be omitted from Fcn-FP-9. As shown by the data, adhesion was high for the compositions containing both functionalized fluoropolymer, which had relatively high concentration of functional monomer, and HTRP.

TABLE 10

Compositions and Results for Examples 17–18

| Example/Control | AA | BB | 17 | CC | DD | 18 |
|---|---|---|---|---|---|---|
| Composition (wt %): | | | | | | |
| Fcn-FP-7 | 10 | — | 10 | — | — | — |
| Fcn-FP-9 | — | — | — | 10 | — | 10 |
| PEEK | — | 2 | 2 | — | 4 | 4 |
| PFA | — | — | — | 90 | 96 | 86 |
| PFA-1 | 90 | 97 | 88 | — | — | — |
| Device | E | M | E | M | M | M |
| Properties: | | | | | | |
| MV ($10^3$ Pa · s) | 4.1 | — | 4.2 | 3.1 | — | 8.1 |
| Peel strength (g/cm) | 124 | 90 | 1092 | 322 | 375 | 1787 |

Example 19 and Controls

This example illustrates the present invention using mild steel foil 0.003 inch (0.076 mm) thick instead of aluminum as the test metal. This foil was low-carbon shim stock (QQ-S-698) from Lyon Industries. A lubricant or protective oil on the surface of the foil as-received was removed with acetone prior to use. All compositions were prepared in the twin-rotor mixer. Compositions and results are shown in Table 11. Adhesion was high for the composition containing both functionalized fluoropolymer and HTRP.

TABLE 11

Compositions and Results for Example 19

| Example/Control | EE | FF | 19 |
|---|---|---|---|
| Composition (wt %): | | | |
| Fcn-FP-9 | 10 | — | 10 |
| PEEK | — | 3 | 3 |
| PFA | 90 | 97 | 87 |
| Properties: | | | |
| MV ($10^3$ Pa · s) | 3.1 | — | 8.1 |
| Peel strength (g/cm) | 45 | 241 | 1690 |

Examples 20–21 and Controls

These examples illustrate the present invention for functionalized fluoropolymers containing different functional monomers (EVE-carbamate and PDMOF) and containing PEVE instead of PPVE. The functionalized fluoropolymer Fcn-FP-10 contained 6.7 wt % of PEVE and 1.1 wt % of EVE-carbamate, and had MV of $1.6 \times 10^3$ Pa·s. The functionalized fluoropolymer Fcn-FP-11 contained 14.9 wt % of PEVE and 2.0 wt % of PDMOF, and had MV of $0.1 \times 10^3$ Pa·s. All compositions were prepared in the twin-rotor mixer. Compositions and results are shown in Table 12. As shown by the data, adhesion was high for the compositions containing both the functionalized fluoropolymer and the HTRP.

TABLE 12

Compositions and Results for Examples 20–21

| Example/Control | GG | HH | 20 | II | JJ | 21 |
|---|---|---|---|---|---|---|
| Composition (wt %): | | | | | | |
| Fcn-FP-10 | 2.5 | — | 2.5 | — | — | — |
| Fcn-FP-11 | — | — | — | 2.5 | — | 2.5 |
| PEEK | — | 4.0 | 4.0 | — | 4.0 | 4.0 |
| PFA | 97.5 | 96.0 | 93.5 | 97.5 | 96.0 | 93.5 |
| Properties: | | | | | | |
| MV ($10^3$ Pa · s) | 4.2 | 4.3 | 3.5 | 4.0 | 4.3 | 3.6 |
| Peel strength (g/cm) | 268 | 518 | 2514 | 13 | 518 | 1070 |

What is claimed is:

1. A melt-fabricable fluoropolymer composition, comprising minor amounts of functionalized fluoropolymer resin and high temperature resistant thermoplastic resin adhesion promoter and a major amount of non-functional fluoropolymer resin.

2. The composition of claim 1, wherein said composition also comprises melt-fabricable fluoropolymer resin that is not functionalized.

3. The composition of claim 1, wherein the functional group of said functionalized fluoropolymer is at least one of —$SO_2F$ and —$CH_2$—Z wherein —Z is —OH, —O—(CO)—$NH_2$, or —OP(O)(OH)$_2$.

4. The composition of claim 3, wherein said functional group is —$CH_2$—OH.

5. The composition of claim 3, wherein said functional group is —$CH_2$—OP(O)(OH)$_2$.

6. The composition of claim 1, wherein said high temperature resistant thermoplastic is at least one of polyetheretherketone, polyetherketoneketone, polyphenylenesulfide, polyethersulfone, and polyamideimide.

7. The composition of claim 6, wherein said high temperature resistant thermoplastic is polyetheretherketone.

8. The composition of claim 6, wherein said high temperature resistant thermoplastic is polyetherketoneketone.

9. The composition of claim 6, wherein said high temperature resistant thermoplastic is polyphenylenesulfide.

10. The composition of claim 6, wherein said high temperature resistant thermoplastic is polyethersulfone.

11. The composition of claim 6, wherein said high temperature resistant thermoplastic is polyamideimide.

12. The composition of claim 1, wherein said high temperature resistant thermoplastic resin adhesion promoter is present in the amount of 0.5–10 wt % based on combined weights of high temperature resistant thermoplastic resin adhesion promoter, functionalized fluoropolymer resin, and non-functional fluoropolymer resin present.

13. The composition of claim 1, wherein said composition also comprises inert filler.

14. The composition of claim 3, wherein said functional group is —$CH_2$—O—(CO)—$NH_2$.

* * * * *